United States Patent [19]

Napadow

[11] Patent Number: 4,955,990
[45] Date of Patent: Sep. 11, 1990

[54] DISPOSABLE BAFFLE SYSTEM AND METHOD

[75] Inventor: Stanley C. Napadow, Elgin, Ill.

[73] Assignee: Protectaire Systems Co., Elgin, Ill.

[21] Appl. No.: 288,326

[22] Filed: Dec. 22, 1988

[51] Int. Cl.$^5$ .............................................. B01D 47/00
[52] U.S. Cl. ........................................... 55/90; 55/260;
 55/436; 55/444; 55/446; 55/DIG. 46; 55/482;
 98/115.2
[58] Field of Search .......................... 55/436, 444–446,
 55/482, 240, DIG. 46, 260, 900; 98/115.2

[56] References Cited

U.S. PATENT DOCUMENTS

| | | | |
|---|---|---|---|
| 1,521,348 | 12/1924 | Ambruster | 55/436 |
| 3,744,222 | 7/1973 | Delao | 55/446 |
| 3,811,371 | 5/1974 | Hardy | 98/115.2 |
| 4,113,454 | 9/1978 | Cvacho | 55/436 |
| 4,237,780 | 12/1980 | Truhan | 55/DIG. 46 |
| 4,321,064 | 3/1982 | Vargo | 98/115.2 |
| 4,484,513 | 11/1984 | Napadow | 55/DIG. 46 |
| 4,684,378 | 8/1987 | Bratten | 55/96 |

FOREIGN PATENT DOCUMENTS 205075 12/1983 German Democratic Rep. ... 55/444
699760 11/1953 United Kingdom .................. 55/444

OTHER PUBLICATIONS

Int Patent Application WO88/04952 dated 7/14/88, 1 sheet drawing, 6 sheets specification.

*Primary Examiner*—Bernard Nozick
*Attorney, Agent, or Firm*—Fitch, Even, Tabin & Flannery

[57] ABSTRACT

A spray booth is provided with inexpensive, disposable pre-baffles which collect overspray thereon prior to the overspray reaching the filtering stages. The preferred disposable pre-baffles are made of paperboard and after being coated with overspray for a short period, e.g., one week, are easily detached and replaced. The paint on the disposable pre-baffles can be baked to convert the paint and the baffle from a hazardous to a non-hazardous waste. The pre-baffles may collect as much as 80% of the overspray, some of which may be collected and re-used, and reduces the amount of sludge, filter cleaning, chemicals used in the reservoir water, and the emissions. Thus, the overall savings easily overcome the expense of replacing the disposable pre-baffles.

17 Claims, 5 Drawing Sheets

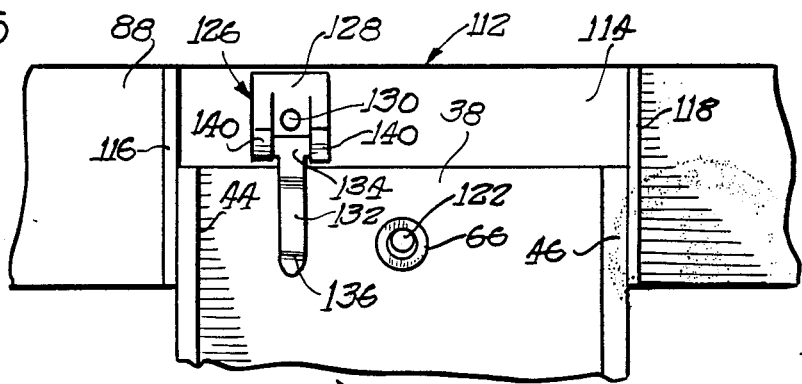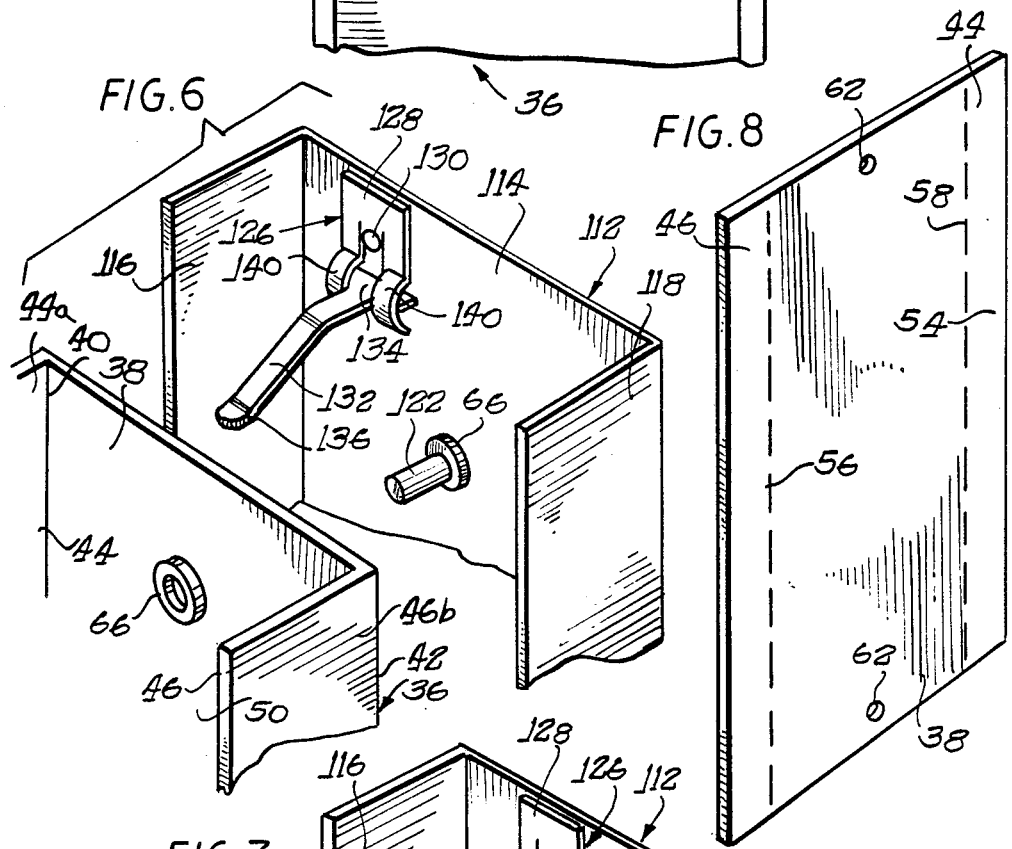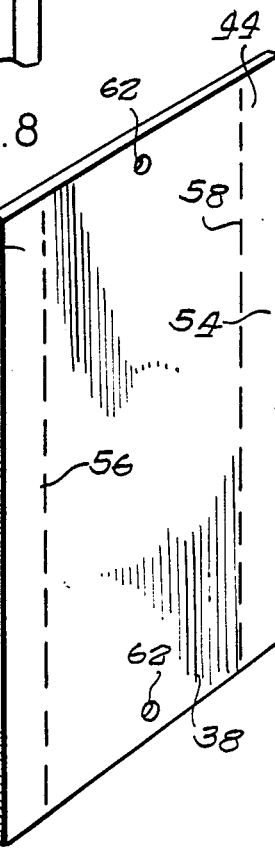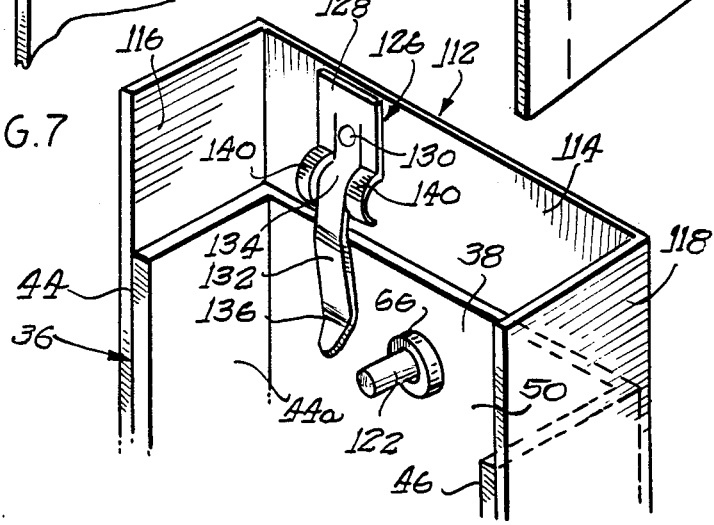

DISPOSABLE BAFFLE SYSTEM AND METHOD

BACKGROUND OF THE INVENTION

1. Field of the Invention

The present invention pertains to the filtering of airborne overspray from an airflow.

2. Description of the Prior Art

Spray booths have long been used in many industrial applications to provide significant advantages in maintaining health and safety standards. In general, without spray booths, workers spraying paints, chemicals, or other materials onto a workpiece would be subject to overspray which is directed toward the workpiece, but which does not stay in contact therewith. One type of spray booth for removing such overspray typically has a ventilation system for establishing an airflow which induces the overspray to travel across one or more filtering stages.

U.S. Pat. No. 4,484,513, assigned to the assignee of the present invention, for example, discloses an improved spray booth having multiple water-wash stages. A first water-wash stage consists of vertically oriented metal baffles having very shallow flanges pointing in a direction opposite to the direction of the overspray. The shape of the baffles provides advantages in maintaining a water flow traveling across the flat, front surfaces of the baffles, i.e., those surfaces extending toward the overspray. Many of the airborne paint particles are trapped by the water flowing down the baffles and carried down the baffles to an underlying tank. Because these baffles are the first wash, a large amount of paint particles are trapped and carried into the tank down below the baffles. Chemical coagulants are added to the water to coagulate the paint particles collected in the water reservoir into a scum that floats and is removed by skimming techniques. The baffles are very effective as a first filtering stage, it has been found that the baffles over a period of time accumulate significant concentrations of overspray material, particularly on the edges of the baffles and extending away from the direction of overspray. This requires that periodic maintenance be performed on the baffles to wipe the accumulated paint from the metal baffles. The paint is a sticky material that does not readily wipe off. The amount of paint sludge accumulating in the tank is quite large and it must be removed either by shutting down the system and scooping out the paint or by sludge removal devices. It is, of course, desirable to reduce the amount of maintenance required to achieve high levels of filtering efficiency. The water in the tank also must eventually be disposed of and it is contaminated water because of the chemicals therein and this water is not easily disposed of. Thus, there is a need for an efficient manner to assist in removing paint spray in such water wash booths.

The coagulant chemicals added to the water add to the yearly cost of running a spray booth as does the cost of cleaning the booth and its down time during cleaning. The amount of sludge collected is another problem since it may be hazardous waste which must be incinerated because of the toxic solvents retained in the paint sludge. Disposal costs for this collected paint sludge are normally about $300 per barrel.

Another problem exists with high solids paint that does not cure or become a dry solid until it is baked and the solvent is driven off. High solid paint, if emitted, will fall on automobiles or other surfaces and, because it is still wet, it can bake on an automotive engine hood when the engine heats the hood and is exposed to sunlight. High solids paint is also expensive and the recovery of overspray for reuse is also desirable.

There is also a need to increase booth efficiency and the present invention is directed toward providing increased both efficiency by providing a pre-baffle system which can collect approximately 80% of the overspray before the overspray reaches the usual filtering stages in the booth. The preferred pre-baffle system only reduces the air flow by about 1/16 or less so that the air flow requirements can still be maintained.

Another advantage of the pre-baffle system is that it can be made of disposable baffles which can be replaced, for example, on a weekly basis and which can be baked to remove the solvents from the paint sludge thereon to dry completely the paint on the baffles which then can be disposed of as non-hazardous waste. By collecting paint particles on the pre-baffles, the amount of overspray impinging on the normal filter stages may be reduced to 20% so that the amount of sludge in the water and the amount of paint collected on the baffles or other filter elements in the booth is drastically reduced. Less cleaning, less water and less sludge on the booth filter stages results in substantial savings. When the filter stages are dry fibrous filter panels as in dry booth, the collection of 80% of the overspray on the pre-baffle system means that the dry filter panels need be changed only once in five times of the current changes. Also, improved air flow may be found in dry booths for longer periods of time because the pre-baffle system helps distribute the air more uniformly across the dry filter panel face. Without the pre-baffle system, the air tends to be more concentrated at the center of the panel face which first fills with paint and then the air and particles are forced outside of the center. This redirection of air in these dry filter booths causes air turbulence and adversely effects the spray pattern of paint being applied to an article in the booth. However, with the pre-baffle system the uniformity of the air pattern is improved in a dry booth to reduce the disturbance of the paint spray pattern.

Because the pre-baffle system can collect 80% of the overspray, it has been found desirable to collect high solid paint overspray for re-use. The high cost of high solid paint and its retention of its liquid state makes it worthwhile to do so. The preferred baffles are made of inexpensive material and, after baking the high solid paints thereon, these disposable pre-baffles may be economically incinerated or lawfully used in a landfill.

SUMMARY OF THE INVENTION

It is an object of the present invention to provide pre-baffle system for a spray booth.

Another object of the present invention is to provide disposable pre-baffles which can be rapidly and easily exchanged when their useful life has expired.

A further object of the present invention is to provide disposable pre-baffles which are easily fabricated from inexpensive materials such as fire-resistant paperboard.

These and other objects of the present invention which will become apparent from studying the appended drawings and accompanying description.

BRIEF DESCRIPTION OF THE DRAWINGS

In the drawings, wherein like elements are referenced alike,

FIG. 5 is a fragmentary view of a baffle assembly shown in a completely assembled configuration;

FIG. 6 is an exploded perspective view of the baffle assembly of FIG. 5;

FIG. 7 is a perspective view of the completed baffle assembly;

FIG. 8 is a perspective view of a paper product blank from which the baffle is formed;

DETAILED DESCRIPTION OF THE PREFERRED EMBODIMENTS

Figure 1:
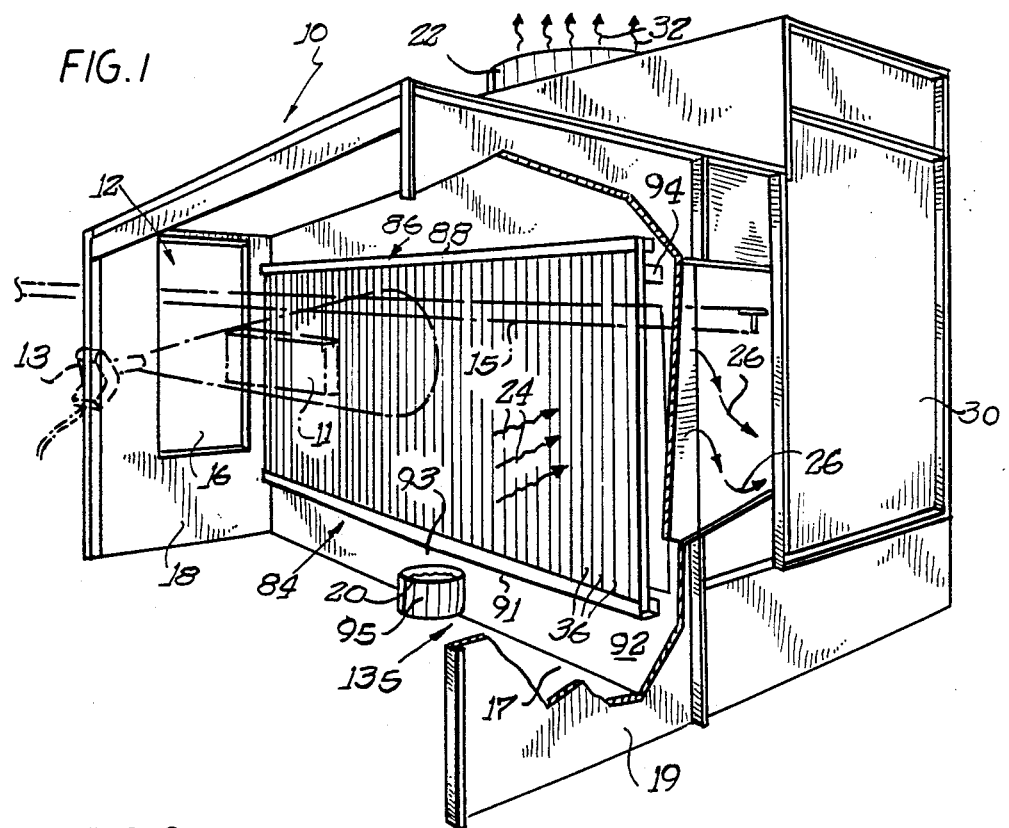
FIG. 1 is a perspective view of a spray booth illustrating aspects according to the present invention.
Figure 2:
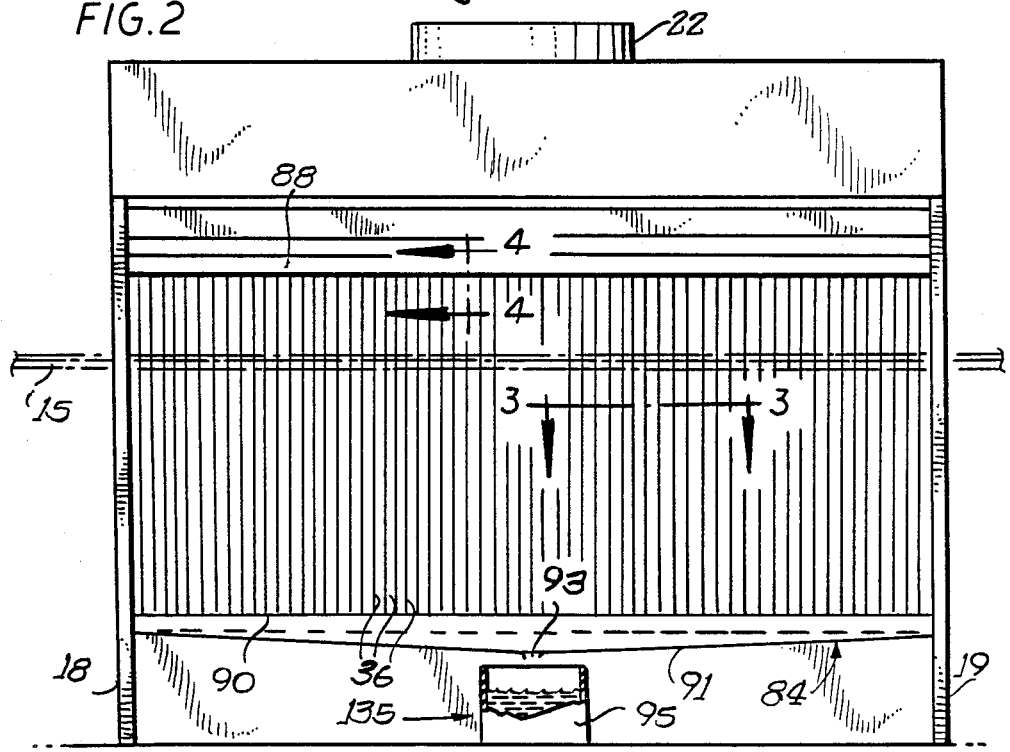
FIG. 2 is a front elevational view of the spray booth of FIG. 1.

Referring now to the drawings, and especially to FIG. 1, a spray booth is generally indicated at 10. The spray booth accommodates an article 11 being sprayed from a spray device 13. The article is located in a front section 12 of the spray booth, in front of a pre-baffle system 20, constructed according to principles of the present invention. Alternatively, articles 11 may be supported on a conveyor track 15 and passed laterally through front section 12, passing through openings 16, 17 formed in sidewalls 18, 19 of front section 12. The conveyor track 15 and other similar conveyor arrangements adapt spray booth 10 for use in a high production environment where the total volume of solid articles sprayed onto articles 11 and creating overspray can be very considerable.

As pointed out above, when a spray is directed onto article 11 using either electrostatic or pressurized airstream techniques, it is inevitable that a substantial percentage of the solid airborne spray particles will not adhere to the article and will pass from the work area to a filter stage. A fan 22 creates an air flow 24 in front section 12 of the spray booth, carrying the overspray in the vicinity of article 11 toward the rear of the spray booth. After being drawn through multiple filter stages the induced air is discharged by fan 22, as indicated by the arrows 32.

Figure 11:
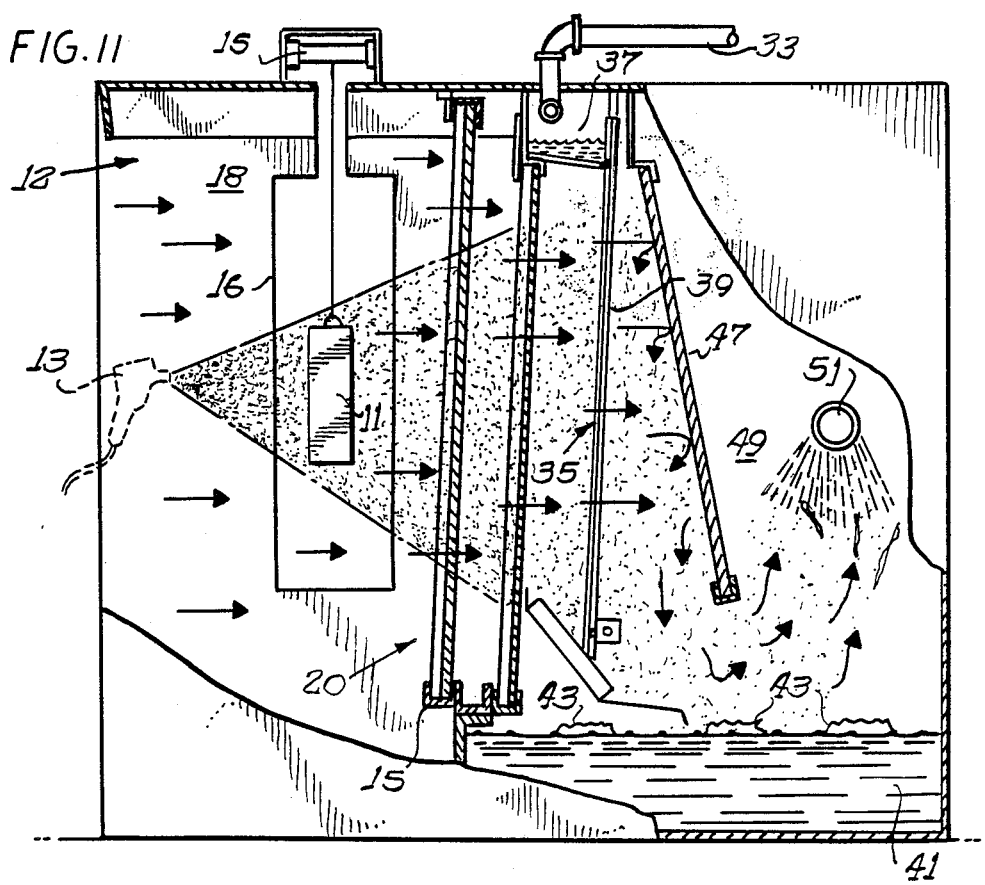
FIG. 11 illustrates wet booth filter stages having a pre-baffle system in front thereof.

In the illustrated embodiment, the filter stages separators are wet filter stages which use water to wet the overspray and may be constructed according to U.S. Pat. No. 4,484,513, a disclosure of which is herein incorporated by reference. The chamber 30, for example, may contain two water-wash filter stages separators such as shown in FIG. 11 wherein a water wash baffle system or separator 35 is used. Water flows from an overhead pipe 33 into an upper reservoir 37 and down along the front faces of fore and after baffles 39. Paint overspray impinges on the water film on the baffles 39 and falls down into the water reservoir 41 in which the water with the chemical coagulants to make the sludge 43 shown floating on the surface of the water in the reservoir 41. The air having pushed through these wet baffles 39 flows downwardly and under an inclined wall 47 into a spray chamber 49 in which a water spray device 51 which causes a water spray and turbulence to wet overspray particles to cause them to drop into the reservoir 41. The present invention may also be used with so-called "dry booths" where the separators are filter media pads, mounted as removable panels, replace the water-wash stages described above.

Figure 13:
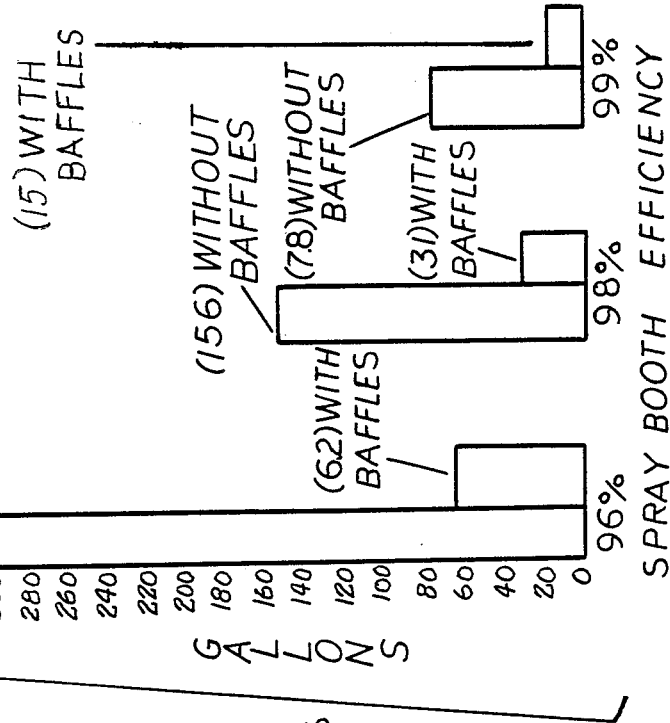
FIG. 13 is a graph of the emissions of FIG. 12 on a yearly basis in the terms of gallons per year.
Figure 12:
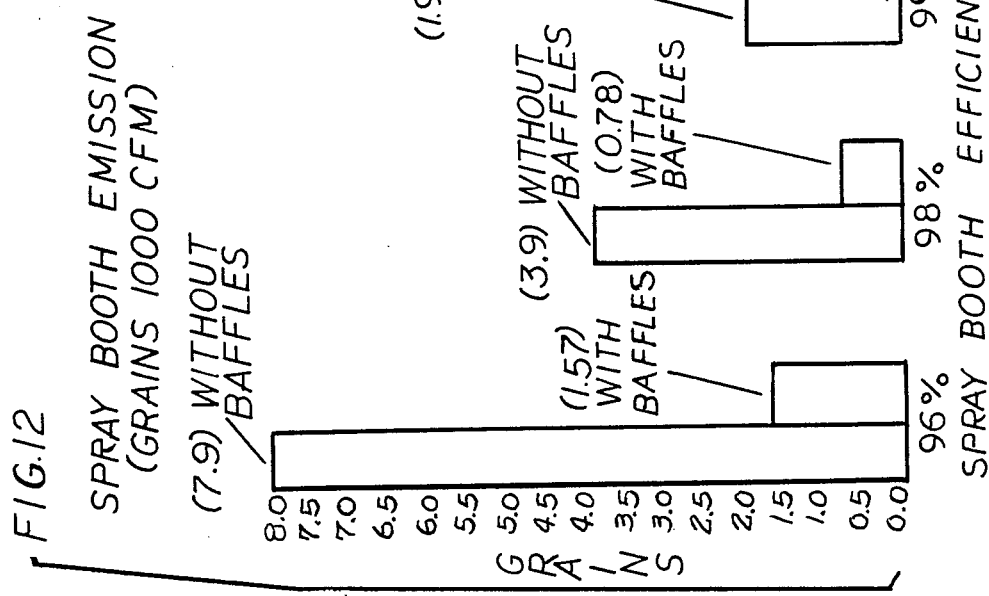
FIG. 12 compares spray booth emissions using the baffles of the present invention versus the same spray booth without such baffles.

In accordance with the present invention, a pre-baffle system 20 using disposable, low cost, channel shaped baffles 21 are placed in front of the normal filtering means or separating means which may be in the form of water filters 35 and 49 such as disclosed in U.S. Pat. No. 4,484,513 or dry fibrous filter panels. The preferred pre-baffle system 20 may capture as much as 80% of the overspray so that only 20% of the overspray need be removed by the water wash filters 35 and 49. By removing as much as 80% of the overspray, the subsequent filters will not accumulate so much paint thereon and need not be cleaned so often. Also, because 80% of the paint is collected on the pre-baffles, only 20% of the paint will be dropping into the reservoir water so that less sludge is accumulated, skimmed, and disposed of at about $300 per barrel of sludge. The chemicals added to the water and the amount of water to be disposed can be drastically reduced to provide further savings. The amount of booth cleaning of the booth sidewalls and the metal baffles 39 is also substantially reduced. Also, the spray booth emission can be cut substantially as shown by graphs in FIGS. 12 and 13. By way of example only, a standard booth with 96% efficiency and emitting 7.9 grains of particulate per 1,000 cfm can be improved to 1.58 grains with the addition of the pre-baffle system 20. In gallon of paint per year, this translates into 312 gallons without the invention and only 62 gallons after the pre-baffle system 20 is installed.

The preferred and illustrated pre-baffle system is comprised of a plurality of inexpensive and disposal baffles 36 which are preferably made of paperboard impregnated with a fire retardant material. By making the baffles so cheaply, they may be used for a period of time, e.g., one week and then removed and disposed of. This is in contrast to the permanent metal baffles 39 that are made of more expensive material and are not connected in the booth for ready replacement as are the disposable filter baffles 36. The illustrated baffles usually begin to lose their shape and sag after one week as the paperboard material becomes wet and loses its strength and as the wet of paint accumulated thereon pulls downwardly on the baffle. The preferred baffles are channel shaped. Manifestly, the baffles 36 may be made of other materials and may have other shapes and fall within the purview of this invention.

The filtering according to U.S. Pat. No. 4,484,513 is more than 98% efficient in its removal of airborne overspray particles. When the filter stage 20 is placed upstream of the initial filter stage described in U.S. Pat. No. 4,484,513, an even higher efficiency is achieved, and due to the efficient prefiltering the filter panel greatly extends the life of the downstream filter stages. When used in conjunction with downstream water-wash stages, the filter panel according to the present invention greatly reduces the chemical usage needed to treat the wash water so as to render the water effective as a wash media and so as to replenish water that has cycled through the filter stages, allowing a closed cycle operation with little or no make-up water.

The initial pre-baffle system 20 of the preferred embodiment comprises a filter panel 84 which is preferably constructed of a spaced-apart plurality of disposable filtering baffles 36 (see FIGS. 5-7). The disposable baffles 36 include an intermediate wall 38 having edges 40, 42 from which sidewalls 44, 46 extend in a direction toward the article 11, i.e., in the direction of overspray. The intermediate wall 38 and the sidewalls 44, 46 together comprise a channel having a recess 50 of generally U-shaped cross-sectional configuration. As will be emphasized in discussing the airflow pattern over the baffles, preferred baffles have their channel recesses 50 open toward the direction of overspray to accumulate as much overspray thereon as possible.

Figure 9:
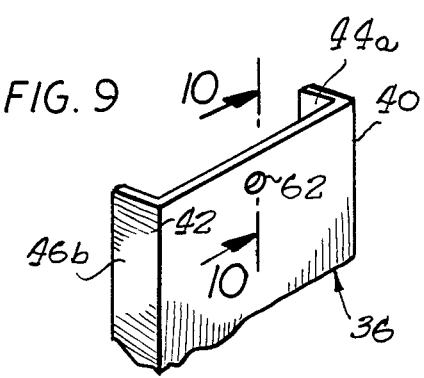
FIG. 9 is a perspective view of a baffle formed from the blank of FIG. 8.
Figure 9A:
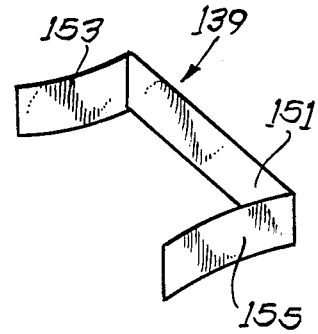
FIG. 9A is a perspective view of a spring clip for applying to a baffle to hold the baffle in a channel shape.
Figure 10:
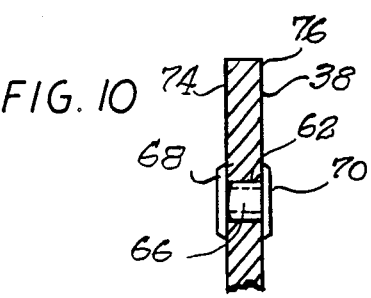
FIG. 10 is a fragmentary cross-sectional view taken along the line 10—10 of FIG. 9.

Referring now to FIGS. 8-10, the baffles 36 are preferably formed from an integral sheet or a blank 54 of inexpensive material so that they can be thrown away after usage. A typical material is a paperboard, or other suitable board-like paper product impregnated with a fire retardant chemical. The blank 54 is slit with a low and folded along lines 56, 58 to form the sidewalls 44, 46. A low knife cut or score is a limited penetration of blank 54, and does not extend completely therethrough. In the preferred embodiment, mounting apertures 60, 62 are formed in the intermediate wall 38, adjacent the end of the baffle, and located intermediate the fold lines 56, 58 of blank 54. Referring especially to FIG. 10, an eyelet or hollow rivet is installed in each mounting aperture 62. The rivet includes enlarged faces 68, 70. Blank 54 is formed of paperboard stock. Other materials suitable for use in the baffles will be discussed below.

The airflow through a commercial spray booth is quite large, typically in the range of 100 fpm or more. The air flows toward the open channels of the baffles and impinges paint particles on the intermediate wall 38, the interior surface 44a, 46a and the exterior surfaces 44b, of the sidewalls.

The material from which the baffle is formed is preferably rigid and self-supporting. If desired, however, the baffles may be made of a material which does not have the strength or rigidity necessary to be self-supporting if a separate support structure is provided therefor. For example, an open wire or expanded metal framework backing may be provided throughout substantial portions of the baffle length. However, such is generally not preferred since additional maintenance is required for the open wire or metal supports. It is generally preferred that the baffles be generally self-supporting so as to require only a minimum of supporting framework so that, when the filtering efficiency of the baffles drops below a desired limit, the only maintenance required is the replacement of the baffle.

Referring now to FIGS. 1-4, the first pre-baffle system 20 consists of a filter panel generally indicated at 84 comprising a spaced-apart plurality of baffles 36 mounted to a framework 86, supported by structural members of the spray booth. The framework 86 consists of two cross members 88, 90 laterally coextensive with the front section 12. The cross members 88, 90 are mounted with brackets (not shown) to a wall 92 in front section 12. Wall 92, facing article 11 and the direction of overspray, has a central opening 94.

Figure 3:
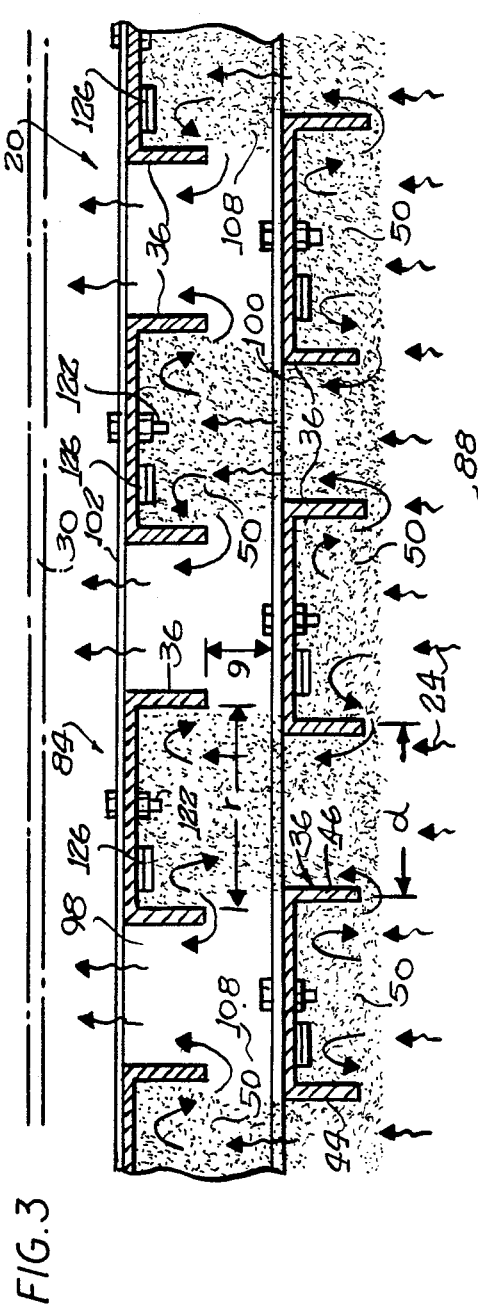
FIG. 3 is a fragmentary cross-sectional view taken along the line 3—3 of FIG. 2.
Figure 4:
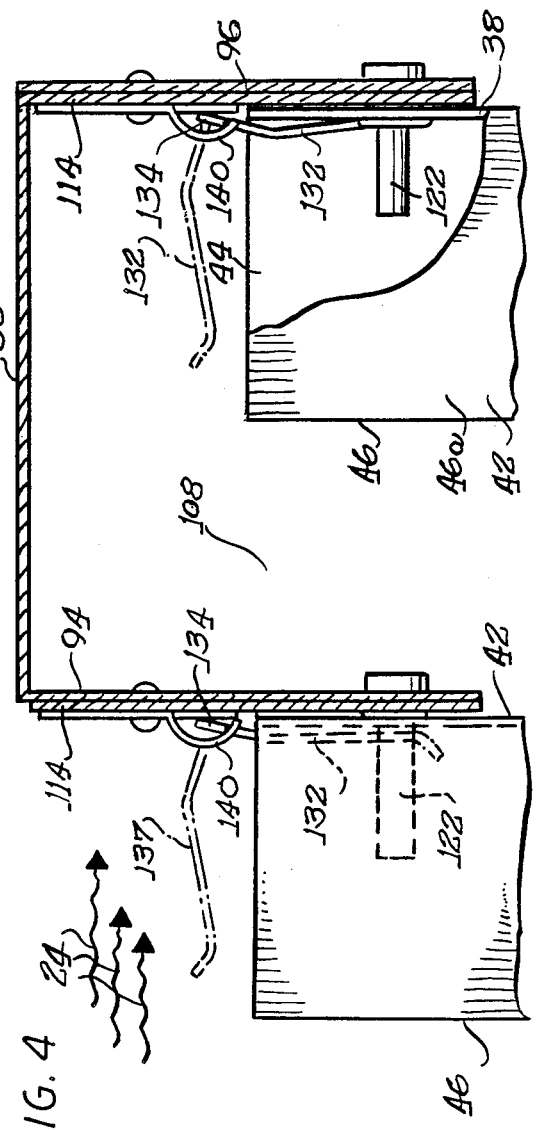
FIG. 4 is a fragmentary cross-sectional view taken along the line 4—4 of FIG. 2.

Referring to FIG. 4, cross members 88, 90 are preferably U-shaped in cross-section so as to have two vertically extending walls, each wall supporting a row of baffles. FIG. 4, for example, shows a cross member 88 having vertical walls 94, 96. Referring to FIG. 3, the bottom cross member 90 has a similar U-shaped cross-section, with a central horizontal wall 98 intermediate a forward wall 100 and a rearward wall 102. The cross members 88, 90 form concave recesses generally opposing each other as can be seen in the right-hand portion of FIG. 1.

In addition to the static loading on the baffles produced by the airflow, the baffles, due to their light-weight and relatively large surface area, could undergo a vibratory or fluttering motion during operation of the spray booth. However, vibratory fatigue, especially for paperboard baffles weakened by a high moisture environment, has not proven to be a problem with the filter apparatus according to the present invention. The mounting of the baffles with a brass eyelet and an elongated spring clip, in addition to the substantial backing support provided by the cross members provides sufficient strength and support while allows easy replacement of the baffles.

As can be seen most clearly in FIG. 3, the framework 86 disposes the plurality of baffles in two spaced-apart planar arrays with the baffles of one planar array staggered with respect to the baffles of the other baffle array. For example, the baffles in the frontal planar array of FIG. 3 are spaced apart by a distance d significantly less than the width r of the baffle recess 50. The baffles of the rearward planar array are centered with respect to the spacing between adjacent baffles of the frontal array. As a result, airflow carrying the overspray is directed onto the baffles of either the frontal row or the rearward row, or both, exiting in the gaps 108 formed between the forward edges of the sidewalls of the rearward row of baffles and the intermediate walls of the baffles positioned in the forward row.

The low pressure created by the fan 22 draws air (see arrows 24) containing the overspray through two rows of baffles to provide to a pre-baffle or first filtering, step. As can be seen from the illustration of FIG. 3, no leakage is permitted around this pre-baffle 20. As mentioned briefly above, the airflow through the pre-baffle 20 is substantial, and is in the neighborhood of 100 fpm. In one commercial embodiment according to the present invention, the baffles had a width of approximately 6 inches and a length of approximately 8 feet, and were unsupported between their top and bottom end portions. Referring to FIG. 4, for example, approximately the first 3 inches at the end portions of the baffles are supported by the front and rear walls 94, 96 of cross member 88, with the support extending to the lateral edges of the intermediate walls 38, where outside corners of the channel members are formed.

Referring now to FIGS. 5-7, the cross members 88, 90 include reinforcing channels 112 at each location along the cross member where an end of a baffle is attached. The reinforcing channels 112 have a cross-sectional configuration slightly larger but otherwise similar to that of the baffles, with an intermediate wall 114 intermediate sidewalls 116, 118. As indicated in FIG. 3, the sidewalls 116, 118 extend the full depth of the sidewalls 44, 46 of the baffles. The nested close fit of the baffle end portions within reinforcing channels 112 maintains a close control over the cross-sectional shape of the baffles.

A mounting stud 122 is secured to the intermediate wall 114 of reinforcing channel 112 and extends in the direction of the article 11 and the overspray generated nearby the article. As indicated above, the intermediate wall 38 of the baffles 36 has grommets 66 installed adjacent their upper and lower end portions. The grommets have a central aperture dimensioned to receive the mounting stud 122 with a relatively close fit. The grommets provide an inexpensive means to maintain the location of the baffles and prevent tearing of the paperboard about the aperture which would allow the baffles to sag or drop downwardly because of their weight and the weight of the paint accumulated on the baffles. In order to prevent the baffle from disengaging the mounting studs 122, hinged spring clips 126 are located immediately adjacent the mounting studs, at each end of the mounting plates.

The spring clips 126 include a body portion 128 attached to reinforcing channel 112 and cross member 88 by a rivet 130, or the like. Clip 126 further includes an arm 132 having a T-shaped end 134 and a free end 136. The T-shaped end of arm 132 is received in a pair of arcuate sections 140 formed at one end of body 128. The T-shaped end 134, when mated with the arcuate sections 140 of body 128, mount the arm 132 for pivoting between an open position remote from the baffle and a closed position in contact with the baffle. The two positions of arm 132 may be seen with reference to FIG. 4 wherein the upper position, drawn in phantom, illustrates the open position where arm 132 is swung clear of baffle 36, permitting its removal and subsequent replacement. Given the relative proportions of the T-shaped end 134 of arm 132 and the arcuate portions 140, arm 134 can be releasably locked at either the open or closed position. When deflected from the open position, the arm is swung against the intermediate wall 38 of the baffle with a resilient bias force which maintains the backing plate in secure engagement with the cross member. For example, FIG. 4 illustrates baffles of both forward and rearward rows clamped against the walls 94, 96 of cross member 88.

For purposes of illustration but not limitation, one commercial embodiment of a filter panel constructed according to principles of the present invention, the sidewalls of the baffles were separated by a distance r of approximately 6 inches. The spacing between opposing sidewalls of adjacent baffles d was approximately 4 inches, while the gap g between the baffles of forward and rearward rows was approximately 2 inches. The baffles of the embodiment were approximately 8 feet in length, with the grommets 66 spaced approximately 2 inches from the free ends of the baffles. Approximately 7½ feet of each baffle mid-section was, according to one aspect of the present invention, able to be left unsupported during operation of the spray booth.

As airflow 24 enters pre-baffle system 20, a significant portion of the airflow impinges upon the intermediate walls 38 of the baffles in the forward row or planar array of baffles. As indicated by the arrows in FIG. 3, airflow is deflected by intermediate walls 38 onto the adjoining sidewalls 44, 46. These walls 38, 44 and 46 all are impinged by paint particles and where high solid paint is collected on the walls, it remains wet and slides down these walls to underlying paint collector 135. Upon emerging from the recess 50 of a front-row baffle, the deflected airflow flows directed between the baffles of the forward row and is directed into the recesses 50 of the second, rearward row of baffles. Thus, the portion of the incoming airflow 24 previously deflected by the frontal row of baffles undergoes a second impingement on the rear baffles as paint particles not impinging on the first row of baffles are directed toward the exposed surface of the intermediate wall 38 of baffles in the rearward row. Air impinging upon the intermediate wall is deflected onto the sidewalls 44, 46 where further paint collection may take place. Thereafter, airflow exits the recess 50 of the rearward array of baffles so as to pass through the gap 108, where is exits between the baffles of the rearward row, and flows toward subsequent, downstream filtering stages.

As will be appreciated by those skilled in the art, it is extremely important that a balanced airflow be maintained in the spraying chamber of a spray booth, so that articles being treated receive a uniform coverage. It has been found that the baffle and filter panel according to principles of the present invention improves the uniformity of the airflow in the region of the article being sprayed. Thus, an additional advantage of filter apparatus constructed according to the present invention is that the need for costly re-spray operations is greatly reduced, if not eliminated.

Although it is generally preferred that the baffles be arranged in a planar array generally normal to the average direction of airflow at that point in the airflow where the prefiltering is to take place, other arrangements are, of course, possible. Further, when two planar rows of baffles are used as a prefilter or pre-baffle assembly, the planar rows need not be arranged parallel to each other, as was described above. Also, although the baffles are preferably disposed in planar rows, the present invention is directed to baffles disposed along curved surfaces or, with baffles disposed one behind the other, virtually any two- or three-dimensional nonplanar array of the baffles can be provided. Thus, a variety of baffle arrangements are possible with the present invention, and many different types of airflow imbalances can be readily corrected by disposing the baffles to create a non-uniform airflow resistance across the cross section of an airflow passageway in the spray booth along which overspray travels toward the spray booth filter stage.

Referring to FIG. 8, the commercial embodiment according to principles of the present invention employs blanks 44 having a width or minor peripheral dimension of approximately 10 inches, and the aforementioned length or major peripheral dimension of approximately 18 feet. The sidewalls 44, 46 had a width of approximately 2 inches, with the remaining, intermediate wall 38 having a width of approximately 6 inches. These dimensions, along with the spacing indicated herein between the forward and rearward rows of baffles and between the baffles of a given row, were found to provide sufficient turbulence and area to remove as much as 80% of the airborne overspray particles.

If desired, the baffles may be coated with one or more different types of materials to improve their operating and safety characteristics. For example, the baffles may be coated with materials that enhance their wetting properties. If desired, the sprayed coating could provide over most, if not all, of the surface of the baffle, and thus the substrate of the baffle can be chosen for optimal surface qualities, without necessarily regarding its surface absorption qualities.

Those skilled in the art will appreciate the hazardous nature of many materials which are sprayed onto articles or which provide a vehicle for those materials. For example, on spraying lacquer paints, lacquer thinner or the like is usually used to prepare the lacquer paint for spraying. Lacquer thinner is a flammable material and accordingly, precautions must be taken to prevent the risk of fire or explosion should a cloud of the lacquer thinner become ignited. As mentioned above, the preferred material for the baffles 36 is a paperboard product. It may be desirable to coat the paperboard baffles with a flame-retardant material so as to render the baffles non-combustible. There are several ways of making the baffles flame-retardant. Herein, paperboard stock is impregnated with a conventional fire retardant material to make the baffles conform to safety standards for use in a spray booth. Other manners of making the baffles fire retardant include coatings which may be applied in any suitable manner, as by spraying, by powdered coatings, or by fluidized bed techniques, for example.

The tops and bottoms of the baffles 36 are both attached in the same manner and it is preferred that the bottom channel 90 be a collector with a downwardly sloped surface 91 that leads to an opening 93 through which the paint drips into a collecting bucket 95 below the opening 93. High solid paints are wet and will coat the pre-baffles 36 into the collecting trough surface 91 and flow down into the bucket. In high solids paint applications, more paint may become overspray than is painted on the articles. If 80% of this overspray is captured by the pre-baffles, a significant amount can be collected for re-use; thus providing additional economies. Manifestly, the collecting means may take other forms than the bucket 137 and inclined surface 91 which is spaced immediately below the lower ends of the baffles 36.

Preferably, spring metal clips 139 of a U-shaped configuration are used to engage and hold the U-shaped configuration. The preferred baffles are shipped flat and are formed into a channel shape at the site of the booth and the spring metal clips are applied to the outside of the channel to hold the sides of the channels against spreading outward and returning to their flat state.

The spring metal clip may take the form of FIG. 9 in which the clip is of a U-shaped configuration having a central web 151 to be placed against the exterior side of backwall 38 of the baffle and having side arms 153 and 155 to abut and hold the baffle sidewalls 44 and 46 at right angles to the backwall 38. The spring clips have their legs 153 and 155 flexible to be expanded apart when being shoved on to the back side of the channel-shaped baffle. The spring gripping force of the legs 153 and 155 provides a tight frictional grip with the sidewalls of the baffle to prevent sliding of the clip down the baffle. Usually, two clips per baffle are sufficient to retain the shape of the baffle with the clips being spaced equidistantly from each other and the upper and lower connections to the cross members. Thus, means are provided to hold the pre-baffles in their channel shape. Herein, this means may be re-used with the clips being removed from a coated baffle and being applied to a new baffle just to be erected into a channel shape.

It will thus be seen that the objects hereinbefore set forth may readily and efficiently be attained and, since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:
1. A method of operating a paint spray booth comprising the steps of:
   spraying articles with a paint spray and generating overspray paint overspray particulates,
   impinging at least a majority of the paint overspray particulates onto disposable baffles to coat the forward faces thereof with overspray particulates,
   flowing air in a substantially uniform manner through slots between adjacent disposable baffles,
   flowing the cleaner and the remaining overspray particulates through a water wash to wet overspray particulates leaving only a small percentage of overspray particulates for emission,
   collecting the wetted overspray particulates in a tank of water containing chemicals for agglomerating,
   discharging the cleaned air with reduced emissions because of the impinging of paint overspray particulates on the disposable baffles,
   accumulating paint on the disposable baffles until a thick coat of paint is accumulated thereon,
   removing the disposable baffles from the booth and disposing of the baffles with the paint thereon, and
   installing new disposable baffles in the booth to collect paint overspray particulates.

2. A method in accordance with claim 1 in which the disposable baffles are paper-based material and including the further step of incinerating the disposable baffles with the paint thereon.

3. A method in accordance with claim 1 including the step of replacing chemicals and water in the tank means at substantially-reduced intervals because of the paint removed by the disposable baffles.

4. A method in accordance with claim 1 in which the step of replacing the disposable baffles comprises releasably connecting each of a plurality of channel-shaped baffles made of a paper-based material at their upper ends to a support.

5. A method in accordance with claim 1 including the step of flowing paint down the disposable baffles and collecting the same for reuse.

6. In a spray booth to remove paint overspray particulates from air flowing through the booth, said booth comprising:
   a booth housing,
   a spray chamber in the housing for spraying articles and generating the paint overspray particulates,
   a disposable baffle assembly having a plurality of disposable baffles for impingement by a majority of the overspray paint particulates, said disposable baffle assembly collecting a majority of the particulates from the air,
   adjacent disposable baffles being spaced from each other by slots through which cleaner air flows after impingement on the baffles,
   forward faces on said disposable baffles adapted to be covered with paint particulates while the slots remain substantially open and unclogged to allow a substantially uniform air flow through the slots between adjacent disposable baffles,
   means releasably connecting the disposable baffles for removal and replacement after substantially paint accumulation on the forward faces thereof,
   water wash means for wetting substantially all but a small percentage of the overspray particulates from the cleaner air,
   tank means for collecting the wetted particulates and having chemicals in the water to agglomerate the wetted paint particulates, said tank means collecting less than one-half of the overspray particulates, and discharge means for discharging the air with the particulate emissions being substantially reduced by the baffle assembly.

7. The paint spray booth of claim 6 in which the disposable baffles are formed of a paper material for low cost and for disposable by burning.

8. The paint spray booth of claim 6 in which a fire retardant material is on said disposable baffles.

9. The paint spray booth of claim 6 in which the disposable baffles are channel-shaped and extend vertically with vertical slots therebetween, said baffles having forwardly-facing flanges on opposite sides of a central web to cause the air to impinge the particulates on the web to coat the same with a substantially thick paint coating.

10. The paint spray booth of claim 9 including collection means at the bottom of the disposable baffles to collect paint flowing down the webs for reuse.

11. In a spray booth to remove paint overspray particulates from air flowing through the booth, said booth comprising:

a booth housing, a spray chamber in the housing for spraying articles and generating the paint overspray particulates, a disposable baffle assembly having a plurality disposable baffles for impingement by a majority of the overspray paint particulates, said disposable baffle assembly collecting a majority of the particulates from the air, said disposable baffles being in the shape of elongated channel-shaped bodies having a central web between a pair of parallel, forwardly-projecting side flanges, said flanges of adjacent baffles being spaced from each other by vertical slots through which cleaner air flows after impingement on the web of the baffles, the webs on said disposable baffles adapted to be covered with paint particulates while the slots remain substantially open and unclogged to allow a substantially uniform air flow through the slots between adjacent disposable baffles, means releasably connecting the disposable baffles for removal and replacement after substantially paint accumulation on the forward faces thereof, a separating means for separating substantially all but a small percentage of the overspray particulates from the cleaner air, discharge means for discharging the air with the particulate emissions being substantially reduced by the baffle assembly.

12. The paint spray booth of claim 11 in which the disposable baffles are formed of a paper material for low cost and for disposable by burning.

13. The paint spray booth of claim 12 in which a fire retardant material is on said disposable baffles.

14. A disposable baffle assembly for a paint spray booth, said baffle assembly comprising:

a plurality of disposable baffles each having a body, said baffles being formed of paper-based material to provide a low-cost and incineratable paint collector, a pair of elongated, parallel flanges and a central web extending therebetween on each of said baffles defining a channel-shaped body for collecting paint on the web by impinging particulates being trapped by the flanges from sliding off the web with air flowing about the flanges, a support for mounting the disposable baffles in vertical positions with vertical air flow slots between adjacent disposable baffles allowing air to flow uniformly as paint builds a thick coating on the web, detachable means for detachably connecting the disposable baffles to the support for replacement thereof after coating of the webs with thick layer of paint, and clips for holding the baffles in said channel shape with the flanges being parallel and projecting substantially normal to said central web.

15. A disposable baffle assembly in accordance with claim 14 in which a fire-retardant material is impregnated into the paper-based material of the bodies.

16. A disposable baffle assembly in accordance with claim 14 in which the detachable means comprises a plurality mounting studs on the support means and stud-receiving apertures in the webs of the channel-shaped bodies.

17. A disposable baffle assembly in accordance with claim 16 in which a retaining means retains the channel-shaped bodies on the studs.

* * * * *

UNITED STATES PATENT AND TRADEMARK OFFICE
CERTIFICATE OF CORRECTION

PATENT NO. : 4,955,990
DATED : September 11, 1990
INVENTOR(S) : Napadow

It is certified that error appears in the above-identified patent and that said Letters Patent is hereby corrected as shown below:

Column 2, Line 6, change "both" to --booth--.

Column 2, Line 62, delete "which".

Column 3, Lines 59-60, after "stages" insert --or--.

Column 3, Line 64, after "stages" insert --or--.

Column 4, Line 3, change "coagulants" to --coagulates--.

Column 4, Line 54, after "wet" delete "of".

Column 5, Line 24, after "low" insert --knife cut--.

Column 5, Line 41, delete the comma after "44b".

Column 6, Line 21, change "allows" to --allowing--.

Column 6, Line 40, after "provide" delete "to".

Column 6, Line 40, after "filtering" delete the comma.

Column 7, Line 64, after "flows" change "directed" to --directly--.

Column 8, Line 8, change "is" to --it--.

Column 10, Line 2, after "paint" insert --with--.

UNITED STATES PATENT AND TRADEMARK OFFICE
CERTIFICATE OF CORRECTION

PATENT NO. :     4,955,990
DATED      :     September 11, 1990
INVENTOR(S) :    Napadow It is certified that error appears in the above-identified patent and that said Letters Patent is hereby corrected as shown below:

Column 10, Line 59, change "substantially" to --substantial--.

Column 11, Line 25, after "plurality" insert --of--.

Column 11, Line 45, change "substantially" to --substantial--.

Column 12, Line 40, after "plurality" insert --of--.

Signed and Sealed this

Fifth Day of May, 1992

*Attest:*

DOUGLAS B. COMER

*Attesting Officer*   *Acting Commissioner of Patents and Trademarks*